(12) United States Patent
Fuller

(10) Patent No.: US 7,947,629 B2
(45) Date of Patent: May 24, 2011

(54) METHOD OF ACIDIZING SANDSTONE FORMATIONS

(75) Inventor: Michael J. Fuller, Houston, TX (US)

(73) Assignee: Schlumberger Technology Corporation, Sugar Land, TX (US)

( * ) Notice: Subject to any disclaimer, the term of this patent is extended or adjusted under 35 U.S.C. 154(b) by 534 days.

(21) Appl. No.: 11/834,322

(22) Filed: Aug. 6, 2007

(65) Prior Publication Data

US 2009/0042748 A1 Feb. 12, 2009

(51) Int. Cl.
  *C09K 8/60* (2006.01)
  *C09K 8/528* (2006.01)
  *C09K 8/74* (2006.01)
  *E21B 43/26* (2006.01)
  *E21B 43/16* (2006.01)

(52) U.S. Cl. ........ 507/219; 507/224; 507/260; 507/267; 507/269; 166/205.1; 166/307

(58) Field of Classification Search .................. 507/219, 507/224, 260, 267, 269; 166/305.1, 307
See application file for complete search history.

(56) References Cited

U.S. PATENT DOCUMENTS

| | | | |
|---|---|---|---|
| 4,646,835 A | 3/1987 | Watkins | |
| 6,436,880 B1 | 8/2002 | Frenier | |
| 6,506,711 B1 | 1/2003 | Shuchart | |
| 6,531,427 B1 | 3/2003 | Shuchart | |
| 6,806,236 B2 | 10/2004 | Frenier | |
| 7,192,908 B2 | 3/2007 | Frenier | |
| 7,299,870 B2 | 11/2007 | Garcia-Lopez De Victoria | |
| 2005/0137095 A1 | 6/2005 | Cawiezel | |
| 2006/0118302 A1 | 6/2006 | Fuller | |
| 2006/0131022 A1 | 6/2006 | Rae | |
| 2008/0035341 A1* | 2/2008 | Saini et al. | 166/279 |

* cited by examiner

*Primary Examiner* — Timothy J Kugel
*Assistant Examiner* — Atnaf Admasu
(74) *Attorney, Agent, or Firm* — Rachel Greene; David Cate; Jeff Griffin

(57) ABSTRACT

An acidizing fluid for sandstone formations is provided, along with methods of acidizing a sandstone formation penetrated by a wellbore. The aqueous acid treatment is a mixture of an aqueous liquid, a fluoride source, and an effective amount of at least one homopolymer or copolymer of a polycarboxylic acid, salt thereof or derivative thereof, which is introduced into the wellbore, and allowed to acidize the formation and concurrently inhibit calcium fluoride formation and impart calcium tolerance to the fluid.

14 Claims, No Drawings

METHOD OF ACIDIZING SANDSTONE FORMATIONS

FIELD OF THE INVENTION

The invention relates to stimulation of wells penetrating subterranean formations. More particularly it relates to matrix acidizing of sandstone; most particularly it relates methods of injecting matrix acidizing fluids that include polymeric additives into a sandstone formation without the use of acid preflush.

BACKGROUND OF THE INVENTION

The statements in this section merely provide background information related to the present disclosure and may not constitute prior art.

There exist several stimulation treatments for increasing production from hydrocarbon reservoirs, such as matrix acidizing. The matrix treatment of carbonate formations with acid works well because of the favorable kinetics of carbonate dissolution by the acid. A variety of different acids may be used in treating carbonate formations. Further, due to the straightforward dissolution of carbonate minerals in solutions of hydrochloric acid, for example, the risks of secondary precipitation are minimized in carbonate acidizing.

In contrast to carbonate formations, sandstone formations are only susceptible to dissolution by hydrofluoric acid (HF). Sandstone matrix acidizing therefore has focused on HF and its use and handling. However, at more extreme mineralogies, temperatures, and reservoir conditions the dissolution reactions in a sandstone matrix may be so rapid that the resulting precipitation reactions are often uncontrollable. To account for this, organic acid/HF blends began to be used in matrix acidizing for retarded dissolution of aluminosilicate. The slower reactions of organic acids allowed greater control over the dissolution (and precipitation) kinetics at higher temperatures. An additional means of precipitation minimization in sandstone acidizing is through the use of multiple, functional stages of fluid in sequence. Sandstone matrix acidizing is typically carried out as a sequence of treatments including a brine preflush to displace incompatible metal ions, followed by an acid preflush to dissolve the calcium carbonate in the matrix. The main treatment fluid is then followed by an HF-containing main treatment fluid, which is then followed by an acid postflush. A main treatment fluid is one which dissolves particles formed or induced by drilling such as aluminosilicates.

HF can be generated in solutions for sandstone acidizing either by mixing of concentrated solutions of HF or by adding an alternative HF-source such as ammonium fluoride or ammonium bifluoride (ABF). Unfortunately, most organic acids used in matrix acidizing fluids have higher-pH values when mixed alone with ammonium bifluoride due to the higher pKa values of organic acids (compared to strong mineral acids). This poses two potential problems with organic acids in matrix applications. First, aluminum fluoride and several other reaction byproducts precipitate faster at higher fluid pH. Additionally, if the fluid, has a higher-pH as prepared, the added ammonium bifluoride in solution may not be fully protonated to HF. In order to combat both of these risks, mineral acid is often added to these blends. Hydrochloric acid (HCl) is frequently the acid of choice to add to these mixtures to maintain the low pH. However, other acids are used for pH-adjustment including formic acid, acetic acid, or methanesulfonic acid, for example.

It would be desirable to condense the preflush and main treatment stages of a typical multistage treatment into a single stage treatment. Further, a need exists for sandstone acidizing fluids that demonstrate the ability to dissolve aluminosilicates and that will not precipitate calcium fluoride without acidic preflush stages that are typical of conventional multistage acidizing.

SUMMARY OF THE INVENTION

This invention relates to a method of treating a sandstone-containing subterranean formation penetrated by a wellbore. Specifically, this invention relates to improving the production of fluids from wells penetrating subterranean formations, and in particular, acidizing methods for subterranean formations formed of predominantly sandstone.

In one embodiment, the method includes injecting into a wellbore, an aqueous acid treatment comprising an aqueous liquid, a fluoride source, and an effective amount of at least one homopolymer or copolymer of a polycarboxylic acid, or salt thereof or derivative thereof, and allowing the mixture to acidize the formation and concurrently inhibit calcium fluoride formation and render calcium tolerance to the fluid. Treatment fluids of the invention are typically formed by blending the components, which may be done in advance, or "on the fly" just prior to injection.

In another embodiment, the method includes injecting into a wellbore an aqueous acidic mixture of an aqueous liquid, a fluoride source, and an effective amount of at least one homopolymer or copolymer of poly(acrylic acid), salt thereof, or derivative thereof, and allowing the mixture to acidize the formation and concurrently inhibit calcium fluoride formation and render calcium tolerance to the fluid.

In yet another embodiment the method includes injecting into a wellbore an aqueous acidic mixture of at least one fluoride source, at least one homopolymer or copolymer of a polycarboxylic acid, salt thereof or derivative thereof, and optionally, one or more organic acids.

In another embodiment, the method provides a simplified means of acidizing and scale inhibition comprising injecting a poly(acrylic) acid/hydrofluoric acid solution as a main treatment fluid.

DETAILED DESCRIPTION OF THE INVENTION

For sandstone formations, the acidizing material provides a source of hydrogen fluoride (HF), which dissolves aluminosilicate minerals in the matrix. The source of hydrogen fluoride can be a solid or a liquid hydrogen fluoride source material. In acidic aqueous fluids, a solid hydrogen fluoride source releases HF and may optionally slowly dissolve, completely or in part. The equilibrium reaction of HF formation is catalyzed in the presence of strong acid. Examples of such solid hydrogen fluoride sources are hydrofluoric acid, ammonium fluoride, ammonium bifluoride, fluoroboric acid, hexafluorophosphoric acid, difluorophosphoric acid, fluorosulfonic acid, polyvinylammonium fluoride, polyvinylpyridinium fluoride, pyridinium fluoride, imidazolium fluoride, sodium tetrafluoroborate, ammonium tetrafluoroborate, salts of hexafluoroantimony, polytetrafluoroethylene polymers (e.g. TEFLON®), and combinations of these.

The hydrogen fluoride source may be used in an amount of from about 0.5% to about 6% by weight of the fluid, more particularly, from about 1% to about 3% by weight. When the hydrogen fluoride source is ammonium bifluoride, it may be present in the final solution in an amount between about 0.5 and about 6% by weight, more particularly between about 1 and about 3% by weight. When the hydrogen fluoride source is ammonium fluoride, larger amounts may be used.

Fluids and methods of treatment according to the invention include at least one polycarboxylic acid, a salt or partial salt of a polycarboxylic acid or a derivative of a polycarboxylic acid for both acidizing and inhibition of calcium fluoride precipitation, thus rendering the fluid calcium-tolerant. Suitable compounds may be homopolymers or copolymers of polycarboxylic acids containing at least two carboxylic acid groups, as well as salts or partial salts of such acids and derivatives of such acids. Useful compounds may have alkyl chains having from one carbon atom to about 26 carbon atoms, and include polymers formed from acids such as formic acid, malic acid, maleic acid, oxalic acid, and the like, as well as acrylic acid, methacrylic acid, 4-vinylbenzoic acid, 4-vinylsalicylic acid, acid-precursors including maleic anhydride and copolymers formed from such acids and acid precursors. Useful salts or partial salts of such acids include sodium salts, potassium salts, ammonium salts and the like.

Such polycarboxylic acids are generally present in concentrations of from about 2 to about 20 weight percent, preferably about 5 to about 10 weight percent.

Fluids and methods of use according to the invention may optionally contain a chelating agent. Some nonlimiting examples of suitable chelating agents include maleic acid, malic acid, tartaric acid, citric acid, certain aminopolycarboxylate and polyaminopolycarboxylate chelating agents (such as, by non-limiting example, NTA (nitrilotriacetic acid), HEIDA (hydroxyethyliminodiacetic acid), HEDTA (hydroxyethylethylenediaminetetraacetic acid, EDTA (ethylenediaminetetraacetic acid), CyDTA (cyclohexylenediaminetetraacetic acid), DTPA (diethylenetriamine-pentaacetic acid)) and certain aminopolymethylenephosphonic acid chelating agents and some of their salts.

One criteria for selection of the chelating agent ("chelant") may be that the log of the stability constant ([Al(III) L]/[Al (III)][L]), where L is the chelating agent, should be greater than about 5, and that the free acid of the chelant should be soluble under the conditions of use. The criteria for the selection of the salt cation will be based upon the pH and on what other materials are present in the treatment fluid or in the formation. Ammonium is the preferred cation and can be used under any conditions under which the fluid embodiments of the invention would be used in the oilfield. Sodium and lithium may be used at conditions under which their fluorides are soluble. Potassium is not a preferred cation as there are potassium-aluminum and potassium-silicon compounds that would precipitate. The chelating acid or its salt is preferably present in an amount between about 5 and about 30 weight percent, more preferably between about 5 and about 25 weight percent, and more preferably between about 5 and about 15 weight percent. The process of matrix acidizing with these fluids can optionally be conducted at temperatures of from about 100° F. (66° C.) to about 400° F. (198° C.).

Some of the important reactions occurring in sandstone matrix stimulation when the sandstone contains clay, and when HF is generated from ammonium bifluoride and hydrofluoric acid and boric acid are present, are shown below:

Primary Reaction: (1)

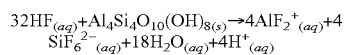

Secondary Reaction: (2)

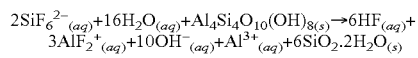

Aluminum Leaching Reaction: (3)

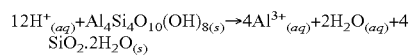

Amorphous silica HF reaction: (4)

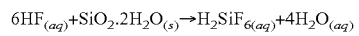

Generation of HF: (5)

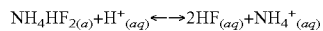

Formation of fluoroborate: (6)

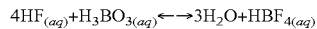

A key problem is that initially-dissolved silicon, in the form of $SiF_6^{-2}$ can react with clays to form solid amorphous silica and aluminum fluorides that may then precipitate. The problem is particularly serious at higher temperatures, for example, temperatures at or above about 150° F. (66° C.). Of course, there are many other species present in solution and as solids, and many other reactions taking place, some to completion and some in equilibrium. The actual compositions and amounts of species present depend upon many factors, in particular the fluids and solids initially present, the temperature, and the time. The accuracy with which the actual species present in solution and as solids can be determined (or predicted) depends upon the complexity of the system and the number of reactions taken into consideration. Simple laboratory experiments may be characterized accurately by calculation and/or measurement; real field situations may be approximated to an extent dependent upon how well the initial conditions are known and how complex a model is used. Computer models are invaluable when considering real field situations.

Not to be limited by theory, but it is believed that matrix acidizing of sandstone mineralogies that contain high concentrations of calcium carbonate necessitates significant volumes of acidic preflush, due to the low solubility of calcium fluoride ($CaF_2$) which can precipitate upon exposure of calcite to hydrofluoric acid. High-carbonate mineralogies can be made more challenging to acidize if the high-carbonate mineralogy is also exposed to a high reservoir temperature, due to the increased kinetics of calcium fluoride precipitation reactions at higher temperatures. Due to significant mineralogical and permeability-heterogeneity, the optimizing of these preflush volumes can be quite difficult; this is particularly difficult when detailed knowledge of a mineralogy is not well known due to mixed or old logging of the formation properties. This difficulty in job design in complicated or unclear mineralogies illustrates the need for simplified HF-fluids that are calcium tolerant and can be executed without preflush fluids. One potential means to lend calcium tolerance to an HF-based fluid is through the addition of chelating agents to the fluid. If the chelating agents have a stability constant greater than about 5, then the calcium ions in solution (resulting from the primary dissolution reaction of calcite or dolomite minerals and compounds, including scale) are present primarily in the chelated form. If the kinetics of the chelant/$Ca^{2+}$ reaction are competitive with the kinetics of calcium fluoride formation, acidizing with the HF/chelating-agent fluid can be carried out without significant precipitation of fluoride. However, chelating agents have additional advantages in sandstone acidizing, toward minimizing precipitation of aluminum byproducts, for example. In the absence of an appropriate chelating agent, aluminum ions that are generated from aluminosilicate dissolution by HF would be present in solution primarily as aluminum fluoride salts or would precipitate, for example as $NH_4AlF_4$ if sufficient ammonium were present. Also, in the absence of the chelating agent, gibbsite ($Al(OH)_3$) could precipitate. Of course there are many possible soluble aluminum-containing species, having up to six fluorides per aluminum; there are also many possible aluminum-containing solids, containing up to about four fluorides per aluminum. Note that precipitation of aluminum typically consumes more fluoride than maintaining aluminum in solution. the aluminum is held in solution by the chelating agent and the silicon is held in solution by the fluoride. The precipitation of an aluminum fluoride salt removes one aluminum and four fluorides from the solution. Stabilization of a silicon in solution requires six fluorides. In the presence of an appropriate chelating agent, such as EDTA, aluminum is complexed by both EDTA and one fluoride, allowing more fluoride to be available to stabilize silicon. We have found that by carefully controlling the pH in the presence of the proper chelating agents, and by simultaneously ensuring that the optimal amounts of ammonium and fluoride are available, the effectiveness of sandstone matrix stimulation is optimized. Only a narrow range of concentrations of ammonium and fluoride may be effective.

A second means of ensuring calcium-tolerance in an HF solution for sandstone acidizing is through the addition of polymeric or oligomeric polycarboxylates. These polycarboxylates have strong binding toward multivalent cationic surfaces. Indeed, recent studies have demonstrated the ability of polycarboxylates to inhibit the formation of calcium sulfate, dicalcium phosphate dehydrate, and calcium fluoride for water-treating and biological applications. These papers hypothesize that the polymers inhibit these industrial scales from forming via a surface adsorption mechanism. In solutions of HF, these polymeric additives would bind similarly to the surfaces of calcium carbonate and block the attack of hydrofluoric acid. However, due to the high solubility of these polymeric additives in aqueous media, after the matrix acidizing treatment, the adsorbed polymer would be produced in the spent acid back to the surface to ensure the lack of polymer residue in the porespace.

The rate of dissolution is important in sandstone matrix stimulation because it has an effect (as does the amount of dissolution) on the location and nature of dissolution. Most important is whether dissolution is localized near the wellbore or extends deep into the formation. Either might be preferred, depending upon the reason for the treatment. The rates (and amounts) of dissolution are, of course, affected by the concentrations of dissolution agents. The dissolution reaction can be slowed, however, without decreasing the ultimate amount of dissolution by retarding the rate of generation of the HF. Although there are physical ways to do this, for example by using the dissolution fluid in the form of an emulsion, a useful approach is to use boric acid ($H_3BO_3$) which reacts with the HF as it is initially generated from the ammonium bifluoride to form fluoroboric acid ($HBF_4$) which then releases HF to the system more slowly. An additional advantage of using boric acid to slow the reactions is that boric acid may also be useful as a clay control additive to stabilize mobile fines particles covalently to the walls of the porespace. Such a stabilizing effect can be recognized by the improved production over a prolonged period of time than would have been predicted based on previous experience in that field without a means for fines control. Preferably, treatment conditions, once the starting ingredients have been mixed in aqueous liquid or water, which contain from about 1 weight percent or less up to 20 weight percent $BF_4^-$ basis $HBF_4$, may be employed. In the embodiment wherein HF and a boron source are used to form fluoboric acid in the aqueous liquid, the relative concentrations or ratios of boron source, e.g., boric acid, and hydrofluoric acid used in preparing the mixture can be adjusted to tie up all of the free hydrofluoric acid (e.g., ad the reaction product of fluoboric acid) or to leave some excess hydrofluoric acid (e.g., unrelated with the boron source). By adjusting the relative amounts of hydrofluoric acid to boron source in the mixture, fine tuning of the amount of free hydrofluoric acid in the composition of the invention may be achieved.

As indicated, low pH is an important aspect of the compositions and method of the invention. In general, the compositions should be formulated or blended to have a pH below 3, preferably 2.5 or below, most preferably below 2. Suitable addition of a non-interfering acid, e.g., HCl may be employed to ensure the desired low pH levels. Other non-interfering acids that may be employed for pH-optimization include acetic acid, formic acid, and methanesulfonic acid. Generally, the polycarboxylate polymer derivative should have a solubility of at least 1 percent, preferably about 5 to about 20 percent, at 25° C. and a pH of 3 or less.

The sandstone matrix stimulation fluid may also contain mutual solvents as components. A preferred mutual solvent is dipropylene glycol methyl ether (DPM). Mutual solvents are used to water-wet the formation and to help dissolve small amounts of organic compounds; mutual solvents are preferably included in a concentration of from about 2 to about 10 weight percent. Other suitable mutual solvents include, by non-limiting example, ethyleneglycolmonobutyl ether, propylene glycol and dipropylene glycol substituted on one or both hydroxyls with methyl, acetate, acrylate, ethyl, propyl or butyl.

The sandstone matrix stimulation fluid embodiments may also include certain surfactants for the purposes of water wetting the formation, lowering the surface tension and dispersing fines. A typical suitable surfactant is cocamidopropyl betaine. Other suitable surfactants are ammonium $C_6$-$C_{10}$ alcohol ethoxysulfate or alcohols, $C_6$-$C_{10}$ ethoxylated quaternary compounds, and many different types of ammonium quaternary compounds.

Sandstone matrix stimulation fluids typically should contain corrosion inhibitors if their pH's are below about 10. Conventional corrosion inhibitors may be used as long as they are suitable for use with and compatible with organic acids or chelating agents. Compounds containing ammonium quaternary moieties and sulfur compounds are suitable (see for example U.S. Pat. No. 6,521,028). Sandstone matrix stimulation fluid embodiments of the invention may also contain many other additives commonly used in oilfield treatment fluids, such as clay control additives, viscosifiers, wetting agents, emulsifiers, agents to prevent the formation of emulsions, and foaming agents. It is to be understood that whenever any additives are included, laboratory tests should be performed to ensure that the additives do not affect the performance of the fluid.

A gas component may optionally be incorporated into some embodiments of the invention. The gas component may be produced from any suitable gas that forms an energized fluid or foam when introduced into the aqueous medium. See, for example, U.S. Pat. No. 3,937,283 (Blauer et al.) hereinafter incorporated by reference. Preferably, the gas component comprises a gas selected from the group consisting of nitrogen, air, argon, carbon dioxide, and any mixtures thereof. More preferably the gas component comprises carbon dioxide, in any quality readily available. The gas component may assist in the fracturing and acidizing operation, as well as the well clean-up process. The fluid may contain from about 10% to about 90% volume gas component based upon total fluid volume percent, preferably from about 30% to about 80% volume gas component based upon total fluid volume percent, and more preferably from about 40% to about 70% volume gas component based upon total fluid volume percent.

When present, the chelating agents, retarded mineral acids, or organic acids are present in an amount between about 5 and about 30 weight percent, more preferably between about 5 and about 25, and most preferably between about 5 and about 15 percent by weight based upon total weight of treatment fluid.

The fluid systems of the invention help to prevent the formation of undesirable scale(s) such as calcium carbonate, calcium sulfate and the like.

Although the compositions and method embodiments of the invention are described in terms of producing wells for oil and/or gas, the compositions and methods have other uses, for example they may also be used in injection wells (such as for enhanced recovery or for storage or disposal) or in production wells for other fluids such as carbon dioxide or water.

Some fluid systems used in some embodiments of the invention are those made from solutions of certain viscoelastic surfactants, in particular certain betaines, optionally in conjunction with co-surfactants or lower alcohols. Examples are described in U.S. Pat. No. 6,399,546, U.S. patent application Ser. No. 10/054,161, and U.S. patent application Ser. No. 10/065,144, all of which have a common assignee as the present application, and all of which are hereby incorporated in their entirety.

We have found that certain viscoelastic surfactant fluid systems may be used at initial surfactant concentrations providing with much higher viscosity than would previously have been thought possible for sandstone acidizing fluids, particularly single acidizing fluids. In matrix treatments, for example, this initial fluid system forms wormholes and then gels at or near the tip of the wormhole, causing diversion. In acid fracturing, for example, this initial fluid gels where leakoff is high, and so this fluid system may help control leakoff.

Many cationic viscoelastic surfactants may be used to viscosify fluids used according to the invention, but certain cationic surfactants are preferred. Exemplary cationic viscoelastic surfactants include the amine salts and quaternary amine salts disclosed in U.S. Pat. Nos. 5,979,557, and 6,435,277 which have a common Assignee as the present application and which are hereby incorporated by reference in their entirety.

Examples of suitable cationic viscoelastic surfactants include cationic surfactants having the structure:

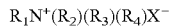

in which $R_1$ has from about 14 to about 26 carbon atoms and may be branched or straight chained, aromatic, saturated or unsaturated, and may contain a carbonyl, an amide, a retroamide, an imide, a urea, or an amine; $R_2$, $R_3$, and $R_4$ are each independently hydrogen or a C1 to about C6 aliphatic group which may be the same or different, branched or straight chained, saturated or unsaturated and one or more than one of which may be substituted with a group that renders the $R_2$, $R_3$, and $R_4$ group more hydrophilic; the $R_2$, $R_3$ and $R_4$ groups may be incorporated into a heterocyclic 5- or 6-member ring structure which includes the nitrogen atom; the $R_2$, $R_3$ and $R_4$ groups may be the same or different; and $X^-$ is an anion. Mixtures of such compounds are also suitable. As a further example, $R_1$ is from about 18 to about 22 carbon atoms and may contain a carbonyl, an amide, or an amine, and $R_2$, $R_3$, and $R_4$ are the same as one another and contain from 1 to about 3 carbon atoms.

Cationic surfactants having the structure $R_1N^+(R_2)(R_3)(R_4) X^-$ may optionally contain amines having the structure $R_1N(R_2)(R_3)$. It is well known that commercially available cationic quaternary amine surfactants often contain the corresponding amines (in which $R_1$, $R_2$, and $R_3$ in the cationic surfactant and in the amine have the same structure). As received commercially available viscoelastic surfactant (VES) concentrate formulations, for example cationic viscoelastic surfactant formulations, may also optionally contain one or more members of the group consisting of solvents, mutual solvents, organic acids, organic acid salts, inorganic salts, and oligomers, polymers, co-polymers, and mixtures of these members. They may also contain performance enhancers, such as viscosity enhancers, for example polysulfonates or polysulfonic acids.

Another suitable cationic viscoelastic surfactant is erucyl bis(2-hydroxyethyl) methyl ammonium chloride, ("EMHAC"), also known as (Z)-13 docosenyl-N-N-bis(2-hydroxyethyl) methyl ammonium chloride. It is commonly obtained from manufacturers as a mixture containing about 60 weight percent surfactant in a mixture of isopropanol, ethylene glycol and water. In this patent, when we refer to "EMHAC" we mean such a solution. Other suitable amine salts and quaternary amine salts include (either alone or in combination in accordance with the invention), erucyl trimethyl ammonium chloride; N-methyl-N,N-bis(2-hydroxyethyl) rapeseed ammonium chloride; oleyl methyl bis(hydroxyethyl) ammonium chloride; erucylamidopropyltrimethylamine chloride, octadecyl methyl bis(hydroxyethyl) ammonium bromide; octadecyl tris (hydroxyethyl) ammonium bromide; octadecyl dimethyl hydroxyethyl ammonium bromide; cetyl dimethyl hydroxyethyl ammonium bromide; cetyl methyl bis(hydroxyethyl) ammonium salicylate; cetyl methyl bis(hydroxyethyl) ammonium 3,4,-dichlorobenzoate; cetyl tris(hydroxyethyl) ammonium iodide; cosyl dimethyl hydroxyethyl ammonium bromide; cosyl methyl bis(hydroxyethyl) ammonium chloride; cosyl tris(hydroxyethyl) ammonium bromide; dicosyl dimethyl hydroxyethyl ammonium bromide; dicosyl methyl bis(hydroxyethyl) ammonium chloride; dicosyl tris(hydroxyethyl) ammonium bromide; hexadecyl ethyl bis(hydroxyethyl) ammonium chloride; hexadecyl isopropyl bis (hydroxyethyl) ammonium iodide; and cetylamino, N-octadecyl pyridinium chloride.

Zwitterionic viscoelastic surfactants are also suitable. Exemplary zwitterionic viscoelastic surfactants include those described in U.S. Pat. No. 6,703,352 which has a common Assignee as the present application and which is hereby incorporated by reference. Exemplary zwitterionic surfactants have the structure:

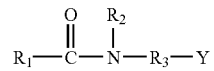

in which $R_1$ is a hydrocarbyl group that may be branched or straight chained, aromatic, aliphatic or olefinic and contains from about 14 to about 26 carbon atoms and may include an amine; $R_2$ is hydrogen or an alkyl group having from 1 to about 4 carbon atoms; $R_3$ is a hydrocarbyl group having from 1 to about 5 carbon atoms; and Y is an electron withdrawing group. More particularly, the zwitterionic surfactant may have the betaine structure:

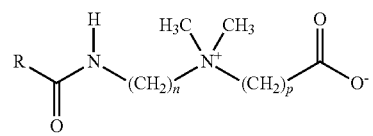

in which R is a hydrocarbyl group that may be branched or straight chained, aromatic, aliphatic or olefinic and has from about 14 to about 26 carbon atoms and may contain an amine; n=about 2 to about 4; and p=1 to about 5. Mixtures of these compounds may also be used.

Two examples of suitable betaines are, respectively, BET-O-30 and BET-E-40. The viscoelastic surfactant in BET-O-30 is oleylamidopropyl betaine. It is designated BET-O-30 here, because as obtained from the supplier (Rhodia, Inc. Cranbury, N.J., U.S.A.) it is called Mirataine BET-O-30; it contains an oleyl acid amide group (including a C17H33 alkene tail group) and is supplied as about 30% active surfactant; the remainder is substantially water, sodium chloride, glycerol and propane-1,2-diol. An analogous suitable material, BET-E-40, was used in the experiments described below; one chemical name is erucylamidopropyl betaine. BET-E-40 is also available from Rhodia; it contains a erucic acid amide group (including a C21H41 alkene tail group) and is supplied as about 40% active ingredient, with the remainder substantially water, sodium chloride, and isopropanol. BET surfactants, and others that are suitable, are described in U.S. Pat. No. 6,703,352.

Amphoteric viscoelastic surfactants are also suitable. Exemplary amphoteric viscoelastic surfactant systems include those described in U.S. Pat. No. 6,703,352, for example amine oxides. Other exemplary viscoelastic surfactant systems include those described in U.S. Patent Application Nos. 2002/0147114, 2005/0067165, and 2005/0137095, for example amidoamine oxides. These four references are hereby incorporated in their entirety. Mixtures of zwitterionic surfactants and amphoteric surfactants are suitable. An example is a mixture of about 13% isopropanol, about 5% 1-butanol, about 15% ethylene glycol monobutyl ether, about 4% sodium chloride, about 30% water, about 30% cocoamidopropyl betaine, and about 2% cocamidopropylamine oxide.

Certain co-surfactants may be useful in extending the brine tolerance, to increase the gel strength, to reduce the shear rehealing time, and/or to reduce the shear sensitivity of zwitterionic viscoelastic surfactant based fluid systems, such as betaine viscoelastic surfactant fluids. An example given in U.S. Pat. No. 6,703,352 is sodium dodecylbenzene sulfonate (SDBS). Another example is polynaphthalene sulfonate. Zwitterionic viscoelastic surfactant's may be used with or without this type of co-surfactant, for example those having a SDBS-like structure having a saturated or unsaturated, branched or straight-chained C6 to C16 chain; further examples of this type of co-surfactant are those having a saturated or unsaturated, branched or straight-chained C8 to C16 chain. Other suitable examples of this type of co-surfactant, especially for BET-O-30, are certain chelating agents such as trisodium hydroxyethylethylenediamine triacetate. Many suitable additives are known for improving the performance of gelled viscoelastic surfactant systems; any may be used in the current invention; they should be tested for compatibility with the compositions and methods of the invention before use; simple laboratory experiments for such testing are well known.

When a VES is incorporated into fluids used in embodiments of the invention, the VES can range from about 0.2% to about 15% by weight of total weight of fluid, preferably from about 0.5% to about 15% by weight of total weight of fluid, more preferably from about 2% to about 10% by weight of total weight of fluid. The lower limit of VES should no less than about 0.2, 0.5, 0.7, 0.9, 1, 2, 3, 4, 5, 6, 7, 8, 9, 10, or 14 percent of total weight of fluid, and the upper limited being no more than about 15 percent of total fluid weight, specifically no greater than about 15, 14, 13, 12, 11, 10, 9, 8, 7, 6, 5, 1, 0.9, 0.7, 0.5 or 0.3 percent of total weight of fluid. Fluids incorporating VES based viscosifiers may have any suitable viscosity, preferably a viscosity value of less than about 100 mPa-s at a shear rate of about 100 $s^{-1}$ at treatment temperature, more preferably less than about 75 mPa-s at a shear rate of about 100 $s^{-1}$, and even more preferably less than about 50 mPa-s.

When incorporated, the aqueous medium of fluids useful of the invention may be water or brine. Where the aqueous medium is a brine, the brine is water comprising optional inorganic salt(s), organic salt(s), or mixture(s) thereof. Preferred inorganic salts include alkali metal halides, more preferably potassium chloride. The carrier brine phase may also comprise an organic salt more preferably sodium or potassium formate. Preferred inorganic divalent salts include calcium halides, more preferably calcium chloride or calcium bromide. Sodium bromide, potassium bromide, or cesium bromide may also be used. The salt is chosen for compatibility reasons i.e. where the reservoir drilling fluid used a particular brine phase and the completion/clean up fluid brine phase is chosen to have the same brine phase.

While the invention has been described with respect to a limited number of embodiments, those skilled in the art, having benefit of this disclosure, will appreciate that other embodiments can be devised which do not depart from the scope of the invention as disclosed herein. Accordingly, the scope of the invention should be limited only by the scope of the attached claims.

Example 1

Slurry dissolution experiments using mixtures of aluminosilicates and calcareous minerals as the solid substrate provide compelling evidence for the ability to similarly dissolve both minerals simultaneously in subterranean field applications. The ability to dissolve clays and carbonate minerals simultaneously without the formation of significant precipitates is an important property that is required for the matrix acidizing of sandstones using HF fluids (including mud acid) without the need for brine/acid preflush stages./acid preflush stages. Slurry tests using mineral mixtures of clay and carbonate minerals are particularly powerful in qualifying these acidizing fluids; in coreflood tests, another common technique for demonstrating acid-stimulation to a formation, suffer from the lack of sandstone mineralogies with high calcium carbonate content.

The following mixed-solid slurry tests were carried out to demonstrate the minimization of calcium fluoride precipitation in low-pH HF-solutions that include soluble polycarboxylate additives. These tests utilized a slurry reactor available from Parr Instrument Company, Moline, Ill., which includes a 4500 series Parr pressure reactor with a capacity of IL of fluid. In each test, the fluid in the reactor was stirred at 100 rpm using a 4 bladed impeller driven by a magnetic drive-coupled electric motor. The cell was fitted with a 4" dip tube to enable the acquisition of samples on a timed basis. The cell was also fitted with a backpressure regulator, which was set at 200 psi. The reactor cell and internal parts were constructed of Hastelloy B. Approximately 70 grams solid mineral was placed into a Teflon cup which was fitted to the inside of the reactor cell. The cell was then sealed and heated to the desired reaction temperature. Separately, approximately 500 g of acid solution were pumped into an accumulator housing and was heated separately to the desired temperature. When both chambers were at the test temperature, the test fluid was transferred to the chamber containing the stirred clay (at 100 rpm) and the test time was started. The tests were typically carried out for 4 hours. Fluid samples were collected at targeted intervals throughout the experiment, were filtered through 0.2 μm filters, and were diluted with deionized water for ICP analysis. The concentrations of dissolved aluminum and calcium resulting from efficient clay/carbonate dissolution were measured in each of those samples using a Perkin-Elmer Optima 2000 DV inductively coupled plasma (ICP) optical emission spectrometry instrument. The residual solids at the end of the experiment were rinsed, filtered, and analyzed using a Rigaku Miniflex X-ray Diffractometer (XRD).

TABLE 1

| [HF] mol/L | pH | [polymer] (w/w %) | Solids Mixture | Temp (° C.) | [Al] mg/L | [Ca] mg/L | $CaF_2$ precip (Y/N) |
|---|---|---|---|---|---|---|---|
| 0.540 | 1.94 | — | 35 g kaolin/ 35 g calcite | 60 | 10300 | 29400 | Y |
| 0.540 | 1.88 | — | 35 g kaolin/ 35 g calcite | 75 | 10100 | 29900 | Y |
| 0.540 | 1.93 | — | 35 g kaolin/ 35 g calcite | 100 | 10900 | 25600 | Y |
| 1.08 | 2.29 | 10% low-mW PAA | 35 g kaolin/ 35 g calcite | 60 | 11600 | 29200 | N |
| 1.08 | 2.17 | 10% low-mW PAA | 35 g kaolin/ 35 g calcite | 80 | 11800 | 25600 | N |
| 1.08 | 2.06 | 15% low-mW PAA | 35 g kaolin/ 35 g calcite | 80 | 7590 | 21300 | N |
| 0.540 | 2.01 | 10% SI-1 | 35 g kaolin/ 35 g calcite | 60 | 5750 | 27800 | N |
| 0.540 | 1.82 | 10% SI-1 | 35 g kaolin/ 35 g calcite | 80 | 10300 | 26700 | N |

Note:
low-MW PAA = poly(acrylic acid) homopolymer ($M_w$ = 1800) from SigmaAldrich
SI-1 = Scale Inhibitor (based on polyacrylate) "L066" from Nalco The slurry test results in Table 1 intend to gauge both the efficient simultaneous dissolution of kaolinite clay and calcium carbonate using low-pH solutions of HF as well as the ability of polycarboxylate derivatives to inhibit the formation of calcium fluoride. The ability to dissolve clay/calcite simultaneously allows for the simplified execution of these fluids in matrix acidizing treatments, where the HF-containing fluid can be injected into the formation without the need for an acid preflush that is typical of conventional sandstone treatments. These experiments were each carried out using 35 grams of kaolinite ($Al_4Si_4O_{10}(OH)_8$) and 35 grams of calcium carbonate as the solid material subjected to reaction at temperature with 500 mL of HF solutions. These experiments varied the temperature between 60 to 100° C. and varied the concentration of HF from 0.54 to 1.08 mol/L. The initial pH value of all of these solutions was roughly pH=2. Several trends are apparent from the data presented in Table 1. First, the final concentrations of aluminum were all very high, indicating that the neither the poly(acrylic) acid (PAA) homopolymer nor the commercial scale inhibitor additives reduced the reactivity of the fluids toward clay materials. Moreover, the final concentration of calcium, as determined using ICP analysis of the effluent, remains very near to the theoretical maximum concentration of calcium possible in solution calculated from the mass balance of solid to fluid (roughly 28000 mg/L calcium). This verifies that the calcium is efficiently dissolved simultaneous with effective clay dissolution.

Additionally, X-ray diffraction analysis was carried out on the residual solids after reaction. This analysis was used to qualitatively estimate the occurrence of calcium fluoride precipitates in the solids after reaction, which shows characteristic diffraction peaks at roughly $2\theta$=47.0, 28.3, and 55.8°. The XRD traces of solids from the control experiments using low-pH solutions of 0.540 M HF at 75 and 100° C. demonstrated diffraction peaks indicative of some precipitation of calcium fluoride (in addition to some residual kaolinite). However, none of the other experiments in Table 1 demonstrated formation of calcium fluoride in the residual solids. This trend was evident in both tests run at HF concentrations of 0.54M and 1.08M, which generate HF in the absence of polycarboxylate additive. These results demonstrate the need for polycarboxylate additives to these low-pH HF solutions in order to inhibit the formation of calcium fluoride during treatment in subterranean applications.

Example 2

Another powerful way of illustrating the stimulation behavior of new fluids for the matrix stimulation of sandstone is through coreflood experiments. In these tests, Berea sandstone cores are confined under pressure at temperature and a treatment fluid candidate is injected through the core. The permeability to 5% $NH_4Cl$ (aq.) brine are measured before ($k_{ini}$) and after ($k_{fin}$) treatment, and a comparison of those values provides a way to quantify stimulation. Additionally, samples of the effluent from the discharge side of the core are collected and analyzed with ICP for solution-concentrations of aluminum, silicon, calcium, and magnesium, for example. These concentrations give some indications as to the efficiency of mineral dissolution from the native mineralogy. One drawback of coreflood testing as a means for screening calcium tolerance of sandstone fluids is that typically, Berea cores are undamaged and are lacking in significant amounts of calcium carbonate in the native mineralogy. A second drawback of Berea cores is the low overall amount of clays or other minerals beside quartz in the mineralogy; for example, XRD mineralogy characterization of the cores used in this study show 88% quartz, 3% illite, 2% kaolinite, 5% K-feldspar, and 2% albite (Na-Feldspar). It is, indeed, difficult to procure large numbers of permeable cores with significant amounts of calcium carbonate or clays. These tests, therefore, show no reduction in the ability of low-pH solutions of hydrofluoric acid with the inclusion of poly(acrylic acid) additives. Additionally, several of the included compositions also include boric acid, which generates fluoroboric acid ($H_4BF_4$) upon mixing with HF before contact with the rock. It is well known to those skilled in the art that fluoroboric acid delays the release of HF into solution through a slow hydrolysis.

Coreflood experiments used Berea sandstone cores (6" long, 1" diameter) in a Formation Response Tester Instrument. The cores were tested at 300° F. under a confining pressure of 2000 psi in a Viton sleeve. A backpressure of 500 psi was used to keep CO2 in solution, allowing accurate measurement of the differential pressure (top to bottom) across the core. After the brine-saturated core has reached temperature, the initial permeability to 5% $NH_4Cl$ brine ($k_{ini}$) was measured separately in the production and injection directions from the differential pressure that is measured across the core [$\Delta P(ini)$] by Darcy's law $$k(ini) = \frac{\mu Q L}{A \Delta P(ini)} \quad (1)$$

Where Q is the volumetric flow rate, $\mu$ is the apparent viscosity of brine, and A and L are the core area and length, respectively. In each test, 12 pore volumes (PV) of treatment fluid were subsequently pumped through the core in the downward injection at 5 mL/min ("injection direction"). During the treatment stage, samples of the effluent during injection of each pore-volume were collected and were later analyzed using inductively-coupled plasma (ICP) optical emission spectrometry. Following the treatment stage, the return permeability to 5% $NH_4Cl$ was measured in the production and injection directions to determine the final permeability ($k_{fin}$).

TABLE 2

| Test # | [HF] (mol/L) | pH-ini | [polymer] (w/w %) | [boric acid] (mol/L) | $k_{ini}$ (mD) | Temp (° C.) | $[Al]_{peak}$ (mg/L) | $k_{fin}/k_{ini}$ | filename |
|---|---|---|---|---|---|---|---|---|---|
| 1 | 0.540 | 1.89 | — | — | 129.9 | 80 | 3240 | 1.29 | LM061807 |
| 2 | 0.540 | 3.19 | — | — | 129.5 | 80 | 1570 | 1.35 | LM0622071 |
| 3 | 0.540 | 1.69 | — | 0.087 | 135.8 | 80 | 2640 | 1.17 | LM0426071 |
| 4 | 1.080 | 2.21 | 10% low-MW PAA | — | 133.6 | 60 | 3470 | 1.14 | LM060107 |
| 5 | 1.080 | 2.19 | 10% low-MW PAA | — | 142.5 | 80 | 4890 | 1.37 | LM060507 |
| 6 | 0.540 | 1.98 | 10% low-MW PAA | 0.087 | 109.9 | 80 | 3330 | 1.23 | LM053107 |

Note:
low-MW PAA = poly(acrylic acid) ($M_w$ = 1800) from SigmaAldrich

The results of a series of coreflood experiments are illustrated in Table 2. This data intends to showcase the effects of temperature, [HF], pH, addition of poly(acrylic acid), and [boric acid] on stimulation and on aluminosilicate dissolution during treatment. Tests 1 and 2 show that at varied initial pH values for solutions of HF without added polymer, modest permeability-stimulation is generated with treatment. Again, it is worth noting that higher stimulation of the native permeability is not really possible in Berea cores as they are generally "clean" and undamaged. These results can be compared to the results of tests 4 and 5, where comparable permeability stimulation is achieved with slightly higher concentrations of dissolved aluminum (from clay dissolution) in the presence of poly(acrylic acid). Finally, comparison of tests 3 and 6 are intended to show the effects of fluoroboric acid (made in situ from mixtures of boric acid and HF) on stimulation of these cores with and without the addition of poly(acrylic acid). Indeed, the permeability stimulation and peak concentrations of aluminum are comparable in these two tests and demonstrate clear stimulation potential. Overall, these results show that: 1) the reactivity of these solutions of HF maintained in the presence of polymeric additive and 2) the polymers, which are known to adsorb to mineral surfaces, do not damage the permeability of these Berea cores.

What is claimed is:

1. A method of acidizing a sandstone formation penetrated by a wellbore comprising the steps of:
   a) injecting into the wellbore an aqueous acid treatment comprising an aqueous liquid, a fluoride source, and an effective amount of at least one homopolymer or copolymer of a polycarboxylic acid, salt thereof or derivative thereof,
   b) allowing the mixture to acidize the formation and
   c) concurrently inhibiting calcium fluoride formation and imparting calcium tolerance to the fluid.

2. The method of acidizing a sandstone formation penetrated by a wellbore according to claim 1 wherein said polycarboxylic acid is a poly(acrylic) acid.

3. The method of acidizing a sandstone formation penetrated by a wellbore according to claim 1 wherein said polycarboxylic acids, salts thereof or derivatives thereof are present in concentrations of from about 2 weight percent to about 20 weight percent.

4. The method of acidizing a sandstone formation penetrated by a wellbore according to claim 1 wherein said polycarboxylic acids are present in a concentration of from about 5 weight percent to about 10 weight percent.

5. The method of acidizing a sandstone formation penetrated by a wellbore according to claim 1 wherein said aqueous mixture further comprises from about 5 weight percent to about 30 weight percent of at least one organic acid, wherein said at least one organic acid is blended into said fluid as a salt and allowed to form an acid in situ.

6. The method of acidizing a sandstone formation penetrated by a wellbore of claim 5 wherein the at least one organic acid is selected from the group consisting of formic acid, acetic acid, lactic acid, glycolic acid, sulfamic acid, malic acid, citric acid, tartaric acid, maleic acid, methylsulfamic acid, and chloroacetic acid.

7. The method of acidizing a sandstone formation penetrated by a wellbore according to claim 1 further comprising from about 5 to about 30 weight percent of a chelating agent selected from the group consisting of maleic acid, tartaric acid, citric acid, nitrilotriacetic acid, hydroxyethyliminodiacetic acid, hydroxyethylethylenediaminetetraacetic acid, ethylenediaminetetraacetic acid, cyclohexylenediaminetetraacetic acid, diethylenetriamine-pentaacetic acid, ammonium salts thereof, lithium salts thereof, sodium salts thereof, and mixtures thereof.

8. The method of acidizing a sandstone formation penetrated by a wellbore according to claim 1 comprising the steps of:
   a) injecting into the wellbore an aqueous acidic mixture formed by blending an aqueous liquid, a fluoride source, a boron source, and from about 2 weight percent to about 20 weight percent of at least one homopolymer or copolymer of poly(acrylic acid), salt thereof, or derivative thereof, and
   b) allowing the mixture to acidize the formation and concurrently inhibit calcium fluoride formation and render calcium tolerance to the fluid.

9. The method of acidizing a sandstone formation penetrated by a wellbore according to claim 8 wherein said poly (acrylic) acids are present in a concentration of from about 5 weight percent to about 10 weight percent.

10. The method of acidizing a sandstone formation penetrated by a wellbore according to claim 8 wherein said aqueous mixture further comprises at least one organic acid.

11. The method of acidizing a sandstone formation penetrated by a wellbore according to claim 10 wherein the at least one organic acid is selected from the group consisting of formic acid, acetic acid, lactic acid, glycolic acid, sulfamic acid, malic acid, citric acid, tartaric acid, maleic acid, methylsulfamic acid, chloroacetic acid.

12. The method of acidizing a sandstone formation penetrated by a wellbore according to claim 8 further comprising a chelating agent selected from the group consisting of maleic acid, tartaric acid, citric acid, nitrilotriacetic acid, hydroxyethyliminodiacetic acid, hydroxyethylethylenediaminetetraacetic acid, ethylenediaminetetraacetic acid, cyclohexylenediaminetetraacetic acid, diethylenetriamine-pentaacetic acid, ammonium salts thereof, lithium salts thereof, sodium salts thereof, and mixtures thereof.

13. The method of claim 1 further comprising injecting a viscosified acid based fluid, whereby the injection of the viscosified acid based fluid creates a fracture within the formation.

14. The method of claim 13 further comprising injecting a viscosified fluid after the injection of the viscosified acid based fluid wherein the viscosified acid based fluid comprises a proppant.

\* \* \* \* \*